United States Patent
Spadea et al.

(10) Patent No.: US 11,693,675 B2
(45) Date of Patent: **\*Jul. 4, 2023**

(54) TARGETING SYSTEM FOR WEB PAGE COMPONENTS

(71) Applicant: salesforce.com, inc., San Francisco, CA (US)

(72) Inventors: Justin Zachary Spadea, Durham, NC (US); Nithyanandniranjan Chandarraj, Fremont, CA (US); James R. Morrin, Jr., Oakland, CA (US)

(73) Assignee: salesforce.com, inc., San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/819,130

(22) Filed: Aug. 11, 2022

(65) Prior Publication Data
US 2023/0132115 A1 Apr. 27, 2023

Related U.S. Application Data

(63) Continuation of application No. 17/452,456, filed on Oct. 27, 2021, now Pat. No. 11,442,754.

(51) Int. Cl.
*G06F 3/048* (2013.01)
*G06F 9/451* (2018.01)
(Continued)

(52) U.S. Cl.
CPC .......... *G06F 9/451* (2018.02); *G06F 3/04842* (2013.01); *G06F 3/04847* (2013.01); *G06F 16/9577* (2019.01); *G06F 16/972* (2019.01)

(58) Field of Classification Search
None
See application file for complete search history.

(56) References Cited

U.S. PATENT DOCUMENTS 5,577,188 A  11/1996  Zhu
5,608,872 A   3/1997  Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Thanh T Vu
(74) *Attorney, Agent, or Firm* — Weaver Austin Villeneuve & Sampson LLP

(57) ABSTRACT

Disclosed are examples of systems, apparatuses, methods, and computer program products for targeting components. A server system obtains a plurality of tags corresponding to a plurality of components available for presentation on a web page. The server system generates a hierarchical structure that indicates: relationships between the plurality of components. The server system provides data to a first client device, the data configured to be processed to cause display of a first user interface based on the hierarchical structure, the first user interface being operable to: select one of the one or more components for association with the prompt interface, and allow a second user interface to be displayed at a second client device, the second user interface including a presentation of the prompt interface including content associated with the prompt interface and with the selected component.

20 Claims, 12 Drawing Sheets

(51) Int. Cl.
  *G06F 3/04847*  (2022.01)
  *G06F 16/957*  (2019.01)
  *G06F 3/04842*  (2022.01)
  *G06F 16/958*  (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,442,754 B1 | 9/2022 | Spadea et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |

(56) References Cited

U.S. PATENT DOCUMENTS

| | | |
|---|---|---|
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0312548 A1* | 12/2010 | Herley ............... G06F 16/9032 704/9 |
| 2011/0218958 A1 | 9/2011 | Warshavsky et al. |
| 2011/0247051 A1 | 10/2011 | Bulumulla et al. |
| 2011/0258562 A1* | 10/2011 | Zhu ........................ G06F 16/95 715/768 |
| 2012/0042218 A1 | 2/2012 | Cinarkaya et al. |
| 2012/0150751 A1* | 6/2012 | Pandey ................ G06Q 10/103 705/301 |
| 2012/0233137 A1 | 9/2012 | Jakobson et al. |
| 2012/0290407 A1 | 11/2012 | Hubbard et al. |
| 2013/0173531 A1* | 7/2013 | Rinearson ............... G06F 16/93 707/608 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2020/0151226 A1* | 5/2020 | Blumenfeld ........ G06F 16/9577 |
| 2020/0175430 A1* | 6/2020 | Kochura ................ H04L 51/02 |
| 2020/0379609 A1* | 12/2020 | Jacob .................... G06F 3/0482 |

OTHER PUBLICATIONS

U.S. Appl. No. 17/456,764, inventors Potter, et al., filed Nov. 29, 2021.

U.S. Notice of Allowance dated May 18, 2022, in U.S. Appl. No. 17/452,456.

* cited by examiner

Figure 1A

```
<foo-my-outer-layer data-target-id="mainComponent1" data-target-parent-optional>  ─ 506
  <foo-my-component data-target-id="myComponent1" data-target-parent-required>  ─ 504
    <lightning-button data-target-id="settingsButton">Settings</lightning-button>  ─ 502
  </foo-my-component>
</foo-my-outer-layer>
```

Figure 5

```
{
    component: 'foo:myComponent', //FK in DB: 0Rb123456789012    602
604 attributes: {
        id: 'myComponent1',
        sObject: 'MyCustomObject__c', //FK in DB: 01l123456789012
        foo: 'Bar' //from data-target-custom-foo="Bar"
    },
606 child: {
        // component: ' '
        // attributes: {},
        //child: {},
    }
}
```

Figure 6

```
let searchScope = document;  ⎯702
let searchNode = rootNode;
while (searchNode && searchNode.child && searchScope) {  ⎯704
    if (autoReveal && typeof searchScope.revealTarget === "function") {  ⎯706
        // reveal the targeted component
        const success = await currentElement.revealTarget(searchNode.child);  ⎯708
        if (! success) {
            // perform an error routine if targeted component could not be revealed
        }
    }
    searchScope = query(searchNode.child, searchScope);  ⎯710
    searchNode = searchNode.child;
}
if (! searchScope) {  ⎯712
    // perform a fallback routine if the targeted component was not found
    // e.g., modify the tree by removing the top node and try again
}
```

Figure 7

TARGETING SYSTEM FOR WEB PAGE COMPONENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates generally to data processing and more specifically relates to targeting of web page components.

BACKGROUND

Creators or builders of user interfaces may want to include prompt interfaces, for example, that explain various features of the user interface. Such prompt interfaces may be useful for guiding a user of the user interface through the features. Creators or builders may want to include a prompt interface that is associated with a particular component, or a particular component within a component, of the user interface. However, it can be difficult to correctly display such targeted interfaces, particularly in systems that are highly customizable.

The subject matter discussed in the background section should not be assumed to be prior art merely as a result of its mention in the background section. Similarly, a problem mentioned in the background section or associated with the subject matter of the background section should not be assumed to have been previously recognized in the prior art.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

Figure 1A:
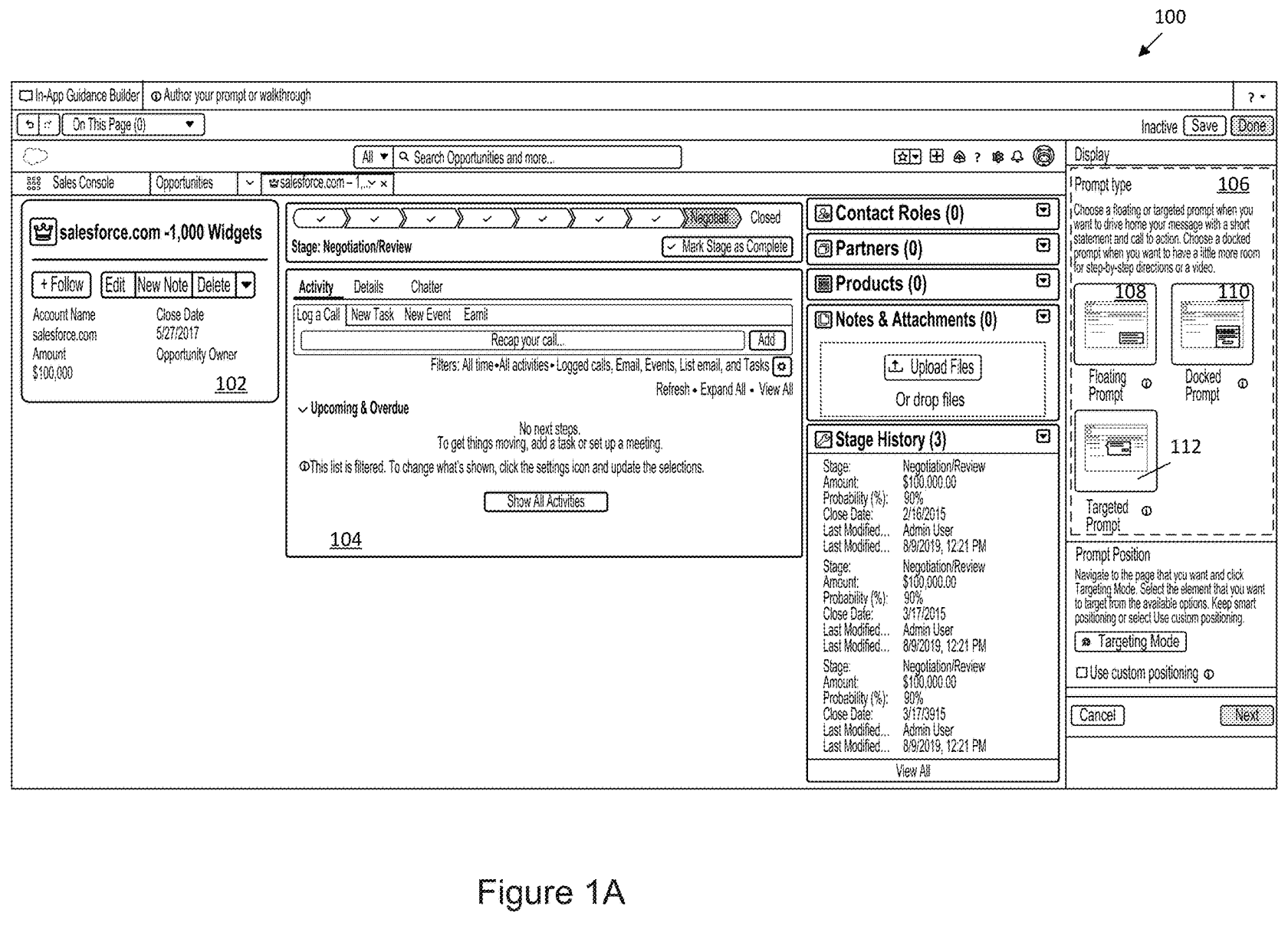

FIGS. 1A-1C show example user interfaces for selecting and including a prompt interface associated with a targetable component in accordance with some implementations.

FIG. 5 shows an example of nested components in accordance with some implementations.

FIG. 6 shows an example of a hierarchical structure of components in accordance with some implementations.

FIG. 7 shows an example of a run-time function that can be performed to identify targetable components in accordance with some implementations.

DETAILED DESCRIPTION

Figure 1B:
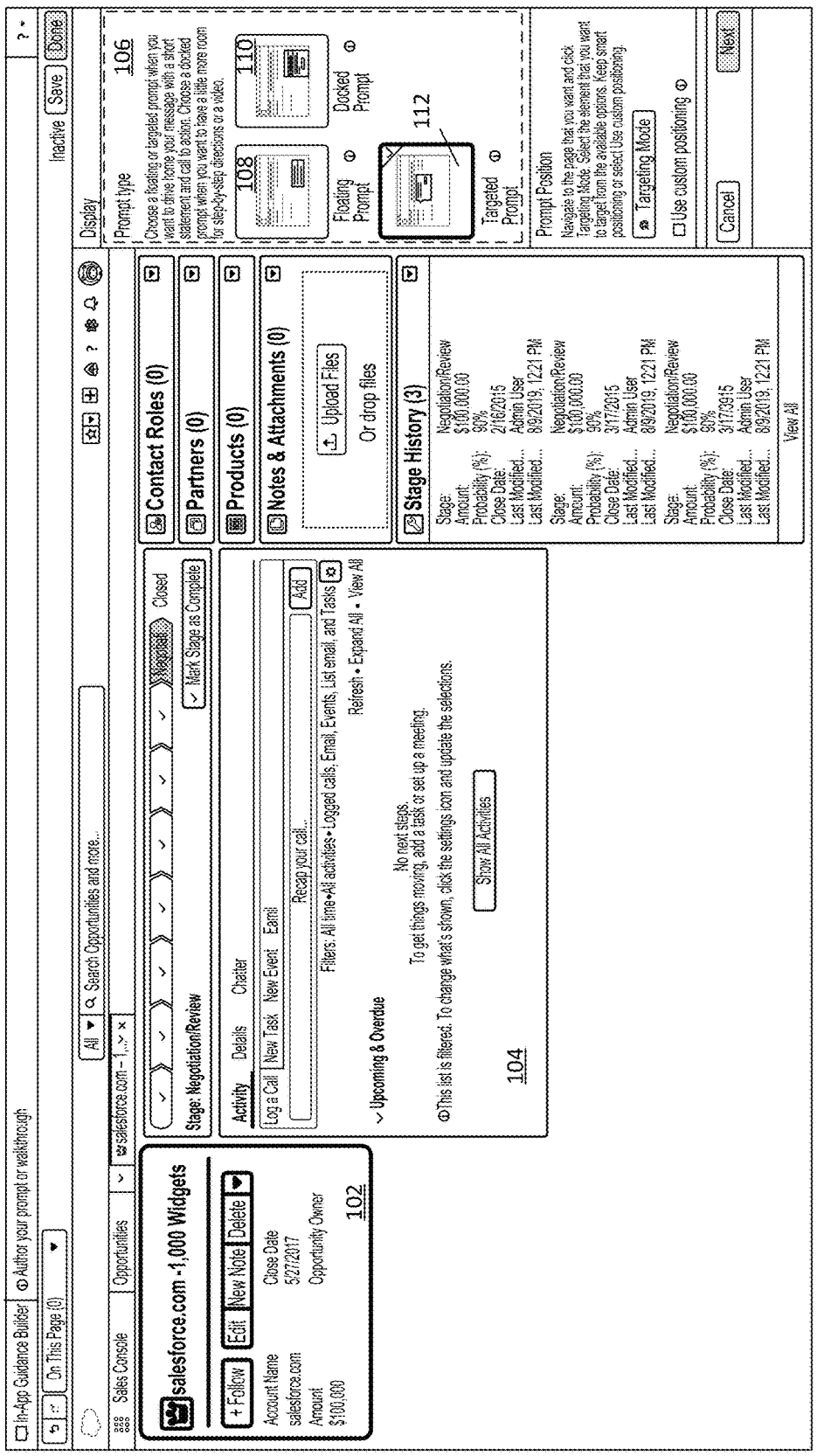

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used, and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer-readable media provide network security orchestration and management across different cloud providers to facilitate transitioning of enterprise infrastructure to public clouds. For instance, a multi-cloud infrastructure can be implemented on popular public cloud platforms including Amazon Web Services (AWS), Google Cloud Platform (GCP), Microsoft Azure and Alibaba Cloud. Customer data can be protected in the various public clouds of the multi-cloud infrastructure. Some implementations of disclosed network security techniques and frameworks provide fundamental security measures to protect customer data from unauthorized access. For instance, some security measures require that only entities (internal or external with respect to a network) with proper permissions and authorizations can access certain resources in the network.

In accordance with some implementations, a targeting system for web page components is described herein. In some implementations, the targeting system allows particular web page components (e.g., tabs, menus, text boxes, lists, related lists, buttons, etc.) to be targetable by a targeted prompt interface. A targeted prompt interface may be a prompt interface that displays, for example, information that provides further context or information. The targeted prompt interface may be associated with a particular component such that the targeted prompt interface is unambiguously associated with the component. In one example, the targeted prompt interface may "point" at the associated component with an arrow portion or other similar visual indicator.

In some implementations, the systems, methods, media, and techniques described herein may be used in connection with a first user interface that is used to construct a second user interface. For example, the first user interface may be associated with an application or page builder application and may be used by a content creator or page builder to construct the second user interface, which may be used by, e.g., an end user. In some implementations, the first user interface may be used to select particular components for inclusion in the second user interface, modify particular components (e.g., in terms of position, size, content, etc.), or the like. Additionally, in some implementations, the first user interface may be used to select a particular component to be associated with a targeted prompt interface. For example, a user of the first user interface may want to select a particular component for association with the targeted prompt interface in order to provide the end user using the second user interface with additional information or context regarding the component.

In some implementations, only components that have been configured to be associated with a targeted prompt interface may be selected for association with a targeted prompt interface within the first user interface. In some implementations, the techniques described herein can be used to correctly identify components that have been configured for association with a targeted prompt interface so that such components can be identified within the first user interface for selection. In some implementations, components may be configured for association with a targeted prompt interface via an attribute of a component tag that specifies that the component is targetable and/or with an identifier that the systems described herein search for when identifying targetable components. In some implementations, attributes of a component tag may additionally or alternatively specify other information useful for identifying targetable components. For example, an attribute may specify that a particular component is targetable and is a nested child component within a parent component. The systems described herein may then identify a targetable component as one that satisfies the specified nesting relationship. Attributes associated with component tags may therefore allow targetable components to be correctly identified, even when modifications are made to the components. For example, a targetable component may be identified even when various attributes of a component are changed, thereby allowing for greater flexibility in targeting web page components.

In some implementations, an attribute in a component tag may specify a function that is to be called to cause at least a portion of the component to be made visible. For example, the function may cause a portion of the component that is to be targeted by a targeted prompt interface to be made visible. In one example, a particular tab of a set of tabs may be made visible responsive to information indicating that the particular tab is configured to be targetable. By allowing such functions to be specified, greater flexibility is achieved.

In some implementations, a first user interface is used by a creator or builder to construct a second user interface utilized by an end user. The first user interface may allow the creator or builder to select, modify, and/or position various components (e.g., tabs, menus, buttons, lists, etc.) within the second user interface. In some implementations, the first user interface may allow the creator or builder to add prompt interfaces that, for example, provide more detail or explanation regarding various features of the second user interface. In one example, a prompt interface may explain actions triggered by selection of a particular component (e.g., selection of a particular button), downstream consequences of modifying a particular component (e.g., modifying a value of a drop-down menu, etc.), or the like.

In some implementations, the first user interface may allow the creator or builder to add a targeted prompt interface that is associated with a particular component. For example, in some implementations, the targeted prompt interface, when presented in the second user interface constructed by the builder or creator using the first user interface, may point at the particular component and/or may be presented at a position that signifies the connection of the targeted prompt interface with the particular component. In one example, the targeted prompt interface may be presented at a position that at least partially overlaps the component with which the targeted prompt interface is associated.

In some implementations, components which are configured to be associated with a targeted prompt interface may be identified within the first user interface such that the creator or builder can select a particular component which is configured to be associated with the targeted prompt interface. For example, in some implementations, the creator or builder may use the first user interface to indicate that a prompt interface that is to be used is to be a targeted prompt interface using a selection tool interface of the first user interface. Continuing with this example, responsive to the targeted prompt interface type being selected, a hierarchical structure, which indicates which components may be associated with a targeted prompt interface may be used to identify the components within the first user interface. As a more particular example, components that are configured to be associated with a targeted prompt interface may be highlighted within the first user interface by displaying a border around the component within the first user interface, highlighting the component within the first user interface, displaying a list of components which may be associated with a targeted prompt interface within the first user interface, or the like. Upon selection of a particular component, the first user interface may be used to enter content to be associated with the prompt interface. The content may include text, images, icons, graphics, hyperlinks, etc. In some implementations, the hierarchical structure may be constructed based at least in part on a Document Object Model (DOM) which indicates components that are targetable by prompt interfaces and other component attributes.

In some implementations, information obtained via the first user interface (e.g., obtained based on input from a first client device, such as that of a page builder or creator) may be stored and used to construct a second user interface that is displayed on a second client device (e.g., that of a customer or end user). For example, the information obtained via the first user interface may indicate positions of particular components, that particular prompt interfaces are to be presented, that particular targeted prompt interfaces are to be presented in connection with particular components, etc. The second user interface may then be presented (e.g., in response to a request to present the second user interface, such as by navigating to a web page corresponding to the second user interface) that includes the components and/or prompt interfaces as specified via the first user interface. In some implementations, the information obtained via the first user interface may be stored in connection with the hierarchical structure such that the second client device (e.g., that of the end user) may utilize the hierarchical structure and the information obtained by the first user interface to render the second user interface. For example, the second user interface may be rendered by presenting components indicated in the hierarchical structure in connection with particular content (e.g., text, images, links, etc.) specified by the creator in the first user interface and stored in connection with the hierarchical structure.

Figure 1C:
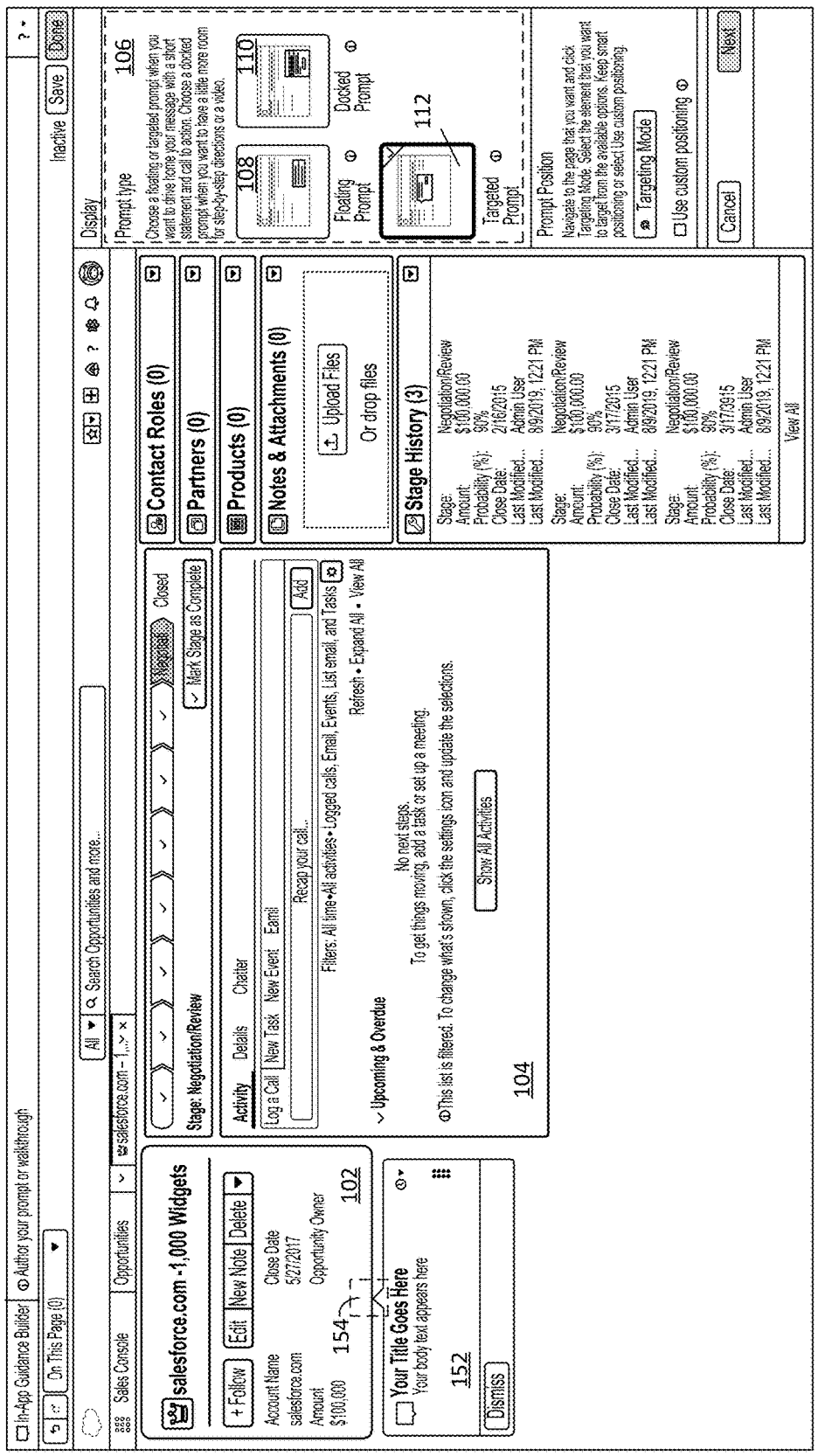

FIGS. 1A-1C show examples of user interfaces that can be used by a creator or builder to construct a second user interface (e.g., that is presented to an end user) in accordance with some implementations. In particular, FIGS. 1A-1C show example user interfaces for adding a targeted prompt interface in accordance with some implementations.

Turning to FIG. 1A, an example of a user interface 100 is illustrated in accordance with some implementations. As shown, user interface 100 includes various components, such as component 102 and component 104. In some implementations, the components may be editable by a user of user interface 100, for example, to configure the components to what is to be rendered in the second user interface displayed to an end user. For example, in some implementations, a component may be resized, moved to a different position, edited (e.g., with respect to content displayed within the component, such as text, images, etc.), or the like.

User interface 100 additionally includes a prompt configuration interface 106, which is sometimes referred to herein as a "selection tool." Prompt configuration interface 106 includes various options of prompts that may be added. For example, prompt configuration interface 106 includes a floating prompt type 108. Selection of floating prompt type 108 may cause a floating prompt to be added, which may be positioned at a fixed position within the configured user interface. As another example, prompt configuration interface 106 includes a docked prompt type 110. Selection of docked prompt type 110 may cause a docked prompt to be added, which may be positioned at a fixed position within a viewport of the configured user interface. As yet another example, prompt configuration interface 106 includes a targeted prompt type 112. Selection of targeted prompt type 112 may cause a targeted prompt, which is presented in connection with a particular component, to be added.

FIG. 1B shows an example of user interface 100 responsive to selection of targeted prompt type 112. For example, responsive to selection of targeted prompt type 112, components that have been configured to be associated with a targeted prompt are highlighted, thereby indicating to a user of user interface 100 that such components may be selected for association with a targeted prompt interface. As a more particular example, with respect to FIG. 1B, components 102 and 104 are highlighted. It should be noted that identification of components which have been configured to be associated with a targeted prompt interface is based on a hierarchical structure that is used to render user interface 100, and is described below in more detail in connection with FIGS. 7 and 8B.

FIG. 1C shows an example of user interface 100 responsive to selection of component 102 to be associated with a targeted prompt interface. In particular, responsive to component 102 being selected, a targeted prompt 152 is presented. As illustrated, targeted prompt 152 includes a pointing aspect 154 that associates, or points at, component 102. It should be noted that pointing aspect 154 is optional, and, in some implementations, targeted prompt 152 may be visually associated with component 102 in any other suitable manner (e.g., by being at least partially overlaid with component 102, or the like). Additionally, as illustrated in FIG. 1C, targeted prompt 152 may be edited or modified by a user of user interface 100. For example, user interface 100 may be used to enter text to be associated with targeted prompt 152, configure a dismiss button, configure timing information (e.g., a time duration over which targeted prompt 152 is to be presented before being automatically dismissed, a number of time targeted prompt 152 is to be presented before no longer being presented, or the like), etc.

FIGS. 2-6 show examples for configuring components which may be associated with targeted prompts. Such configuration may be performed by configuring a tag associated with a particular component. For example, the tag may indicate whether the particular component is targetable, a name or identifier of the component, an Application Programming Interface (API) that is associated with the component, a function that is to be called to cause a particular portion of the component to be made visible, a nesting relationship between two or more components, or the like. In some implementations, such configuration may be made by an entity that provides a first user interface (e.g., as shown in and described above in connection with FIGS. 1A-1C) for configuration of a second user interface. In some implementations, configuration of components may be made by a third-party entity that generates components that may be used in the first user interface.

Figure 2:
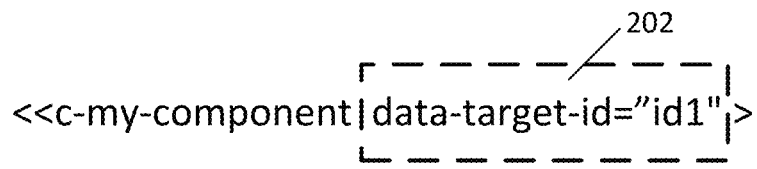
FIG. 2 shows an example of a name attribute for a targetable component in accordance with some implementations.

FIG. 2 shows an example of an identifier attribute for a component that may be associated with a targeted prompt interface in accordance with some implementations. For example, the tag shown in FIG. 2 is associated with a component named "c-my-component." As illustrated, the tag includes a field 202 that may indicate that the component is configured to be associated with a targeted prompt interface. In some implementations, a value of field 202 may indicate a name or identifier of the component that is to be used to identify the component at run-time (e.g., during use of the first user interface, as shown in and described above in connection with FIGS. 1A-1C). In the example shown in FIG. 2, field 202 has a value of "id1," indicating that components with the identifier of "id1" may be identified at run-time during presentation of the first user interface when identifying components configured to be associated with a targeted prompt interface.

Figure 3:
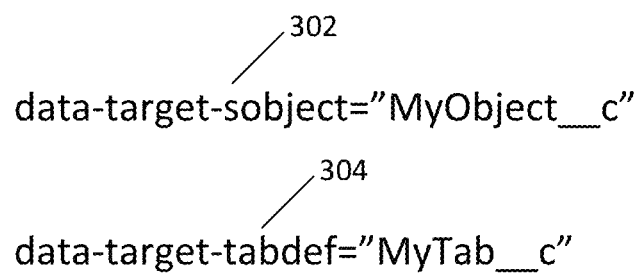
FIG. 3 shows an example of an Application Programming Interface (API) identifier attribute for a targetable component in accordance with some implementations.

In some implementations, an attribute of a component may specify (e.g., within a tag associated with the component) an API that is to be called to render the component. Such an API may be used to, for example, render multiple tabs of a tab component, render multiple levels of a multi-level list, call other functions to be used to render the component, etc. FIG. 3 shows an example of an attribute that may be included in a tag associated with a component that specifies an API to be called in association with the component in accordance with some implementations. As illustrated, attribute 302, for a particular "sobject" component, specifies an API "MyObject_c." As illustrated, attribute 304, for a particular "tabdef" component, specifies an API "MyTab_c." It should be noted that, in some implementations, a specified API name may be converted to a foreign key (FK) representation that associates or maps the API name specified in the attribute with a FK in a database. By mapping the API name to a FK, the API may still be identified even if the API name changes, thereby allowing referential integrity. In one example, an API initially named "MyTab_c" may be mapped to a particular FK. Continuing with this example, if the API is renamed to, e.g., "MyTab1_c," the renamed API will still be associated with the same FK. By mapping API name to a fixed FK, the correct API can be identified even if the API name is changed. Moreover, because different customers or entities may utilize different API names (mapping to the same FK), translating or converting API name to FK may allow the same hierarchical structure to be utilized by different entities or customers. At runtime, the FK may be translated back to an API name for execution.

Figure 4:
FIG. 4 shows an example of a function identifier attribute for a targetable component in accordance with some implementations.

In some implementations, an attribute of a component may specify a function that is to be called in order for a particular part of the component to be associated with a targeted prompt interface. For example, in some implementations, the function may cause a particular portion of the component to be made visible, where the particular portion is to be associated with the targeted prompt interface. As a more particular example, in an instance in which a particular tab of a tab component may be associated with a targeted prompt interface, and in which the particular tab is not the default presented tab (e.g., the top tab), the function may cause the tab to be rendered prior to indicating the tab as able to be associated with the targeted prompt interface. FIG. 4 shows an example of an attribute that specifies a function to be called in association with a particular component. For example, attribute 402 indicates that a function "bar" is to be called.

In some implementations, component tags may indicate relationships between two or more components that are nested. For example, a component tag may indicate whether a particular child component must be located within and/or nested within a particular parent component to be identified, or, conversely, whether the particular child component is not required to be located within and/or nested within the particular parent component. By way of example, in an instance in which a settings button is a component that may be associated with a targeted prompt interface and is located within a first parent component, and in which the first parent component is in turn located within a second parent component, the component tags may indicate whether: 1) the first parent component must be nested within the second parent component; and/or 2) the settings button must be nested within the first parent component. In some implementations, this may be used at run-time (e.g., when rendering a first user interface on a client device associated with a creator or builder) to correctly identify targetable components. Referring to the above example, in an instance in which the settings button has an identifier of "settingsButton," and in which there are multiple settings button components within the page, the relationships between the various components may be used to correctly identify the particular settings button that may be associated with a targeted prompt interface. For example, a "settingsButton" instance that has the required nesting relationship as specified by the component tags may be identified. In a particular example, in an instance in which the component tags indicate that a targetable instance of "settingsButton" is required to be within a parent component, and in which there are two "settingsButton" component instances, the targetable instance may be identified by identifying the instance of "settingsButton" that is nested within the required parent component.

FIG. 5 shows an example of component tags that illustrate relationships between nested components in accordance with some implementations. As described above, the relationships indicated may be used to correctly identify targetable components, i.e., those components that are configured to be associated with a targeted prompt interface. As illustrated in FIG. 5, a tag 502 is associated with a "lightning button" component and has an identifier of "settingsButton." A tag 504 is associated with a "foo-my-component" type component, and has an identifier of "myComponent1." A tag 506 is associated with a "foo-my-outer-layer" type component, and has an identifier of "mainComponent1." As illustrated by the nesting of tag 502 within tag 504, which is in turn nested within tag 506, the lightning button is to be nested within the foo-my-component component, and the foo-my-component component is to be nested within the foo-my-outer-layer component. As noted by the attribute "data-target-parent-required" within tag 504, the lightning button, in order to be associated with a targeted prompt interface, must be located within a foo-my-component component. However, as indicated by the attribute "data-target-parent-option" within tag 506, the foo-my-component component need not be located within the foo-my-outer-layer component.

In some implementations, a hierarchical structure (e.g., data structure) may be constructed based on tags associated with components. In one example, the hierarchical structure is constructed based at least in part on a DOM that specifies various components and tags associated with the components. The hierarchical structure may indicate attributes of various components (e.g., as shown in and described above in connection with FIGS. 2-4) and/or relationships between components (e.g., as shown in and described above in connection with FIG. 5). The hierarchical structure may be a Javascript Object Notation (JSON) structure, an Extended Markup Language (XML) structure, or the like. In some implementations, the hierarchical structure may be created on a server device. Techniques for generating such a hierarchical structure are shown in and described below in connection with FIG. 8A. In some implementations, a server may transmit a hierarchical structure to a client device, where the hierarchical structure may be utilized to render a first user interface usable (e.g., by a creator or builder) to construct a second user interface (e.g., that is provided to an end user). Techniques for utilizing a hierarchical structure in connection with such a first user interface are shown in and described below in connection with FIG. 8B.

FIG. 6 shows an example of a portion of a hierarchical structure in a JSON format in accordance with some implementations. As illustrated, the portion of the hierarchical structure shown in FIG. 6 describes a component "myComponent." As illustrated by comment 602, "myComponent" may be associated with an FK in a database that pairs "myComponent" with the database key.

As illustrated in FIG. 6, "myComponent" is associated with attributes 604. Parameters and values within attributes 604 may be derived from attributes of the tag associated with "myComponent." For example, attributes 604 includes an "id" parameter, that has a value that may be derived from a corresponding "data-target-id" attribute, as shown in and described above in connection with FIG. 2. As another example, attributes 604 includes an "sObject" parameter that specifies an API to be called in association with "myComponent." The "sObject" parameter value may be identified from an attribute that specifies an API, as shown in and described above in connection with FIG. 3. As yet another example, attributes 604 includes a "foo" parameter that specifies a function to be called, which may be identified based on a "data-target-custom-foo" attribute of the tag, as shown in and described above in connection with FIG. 4.

Additionally, the hierarchical structure may specify nested components in section 606. For example, a child component nested within the "myComponent" instance may be specified, and attributes associated with the child component may be specified. Moreover, further nested child components may additionally be specified for any suitable number of nested components. Child components may be identified based on component tags nested within the "myComponent" tags, as shown in and described above in connection with FIG. 5. It should be noted that in the example shown in FIG. 6, the "myComponent" instance does not have any nested child components.

In some implementations, a hierarchical structure is transmitted to a client device for rendering a first user interface usable (e.g., by a creator or builder) to construct a second user interface. The first user interface may display interfaces usable to identify and select particular components that are configurable to be associated with targeted prompt interfaces. To identify components that have been configured to be associated with targeted prompt interfaces, one or more functions may be performed at run-time (e.g., on a client device of an end-user that is viewing the second user interface configured by the creator or builder) to identify the components that have been configured to be associated with targeted prompt interfaces. For example, in some implementations, the one or more functions may step through or iterate through the hierarchical structure to identify functions to be performed in connection with the targetable component, to perform an error routine in response to not identifying a particular targetable component, or the like. In some implementations, a creator or builder may select a component to be associated with a targeted prompt interface that is not visible by default in the second user interface, such as a non-default tab of a set of tabs, a menu option that is not a default menu option, or the like. In some such implementations, the one or more functions may cause the selected component to be revealed (e.g., by being programmatically "clicked") such that the targeted prompt interface can then be presented.

FIG. 7 shows an example of a run-time function that may be implemented on an end user client device in accordance with some implementations. At 702, the function can initialize a search node as a root node of the hierarchical structure (e.g., a parent component in a set of nested components). The function can then begin iterating through the nested nodes starting from the current search node. At 704, the function can determine whether an auto reveal attribute has been set for the component corresponding to the current search node. If, at 704, the auto reveal attribute has been set, the function can, at 706, call another function to reveal the targetable portion of the component. For example, at 706, the function calls a "revealTarget" function. The function that is called may be specified via a function call attribute associated with the component, as shown in and described above in connection with FIG. 4. The function may be specified by the creator or the builder of the second user interface, and may be a function that is associated with the component. At 708, the function can determine if the function called at 706 executed successfully. If, at 708, it is determined that the function called at 706 did not execute successfully, the function can perform an error routine. The error routine may involve presenting an error message. At 710, the function can update the current search node to be a nested child node (e.g., a child component) and can continue looping through all nested nodes.

After iterating through all nested nodes, at 712, the function can determine whether a targetable component was not found. For example, the targetable component may have not been found based on a name identifier mismatch, e.g., no component having a specified identifier was found in the hierarchical structure. As another example, the targetable component may have not been found due to no component being identified which was nested within a required parent component, as specified by the attributes. At 712, if the targetable component was not found, a fallback routine may be performed. For example, the fallback routine may involve presenting an error message. As another example, the fallback routine may involve removing a top-level node of a set of nested nodes and attempting to identify the targetable component again. In this case, the fallback routine may be able to identify targetable components that are not nested in accordance with the relationships specified in the hierarchical structure but nevertheless exist.

Figure 8A:
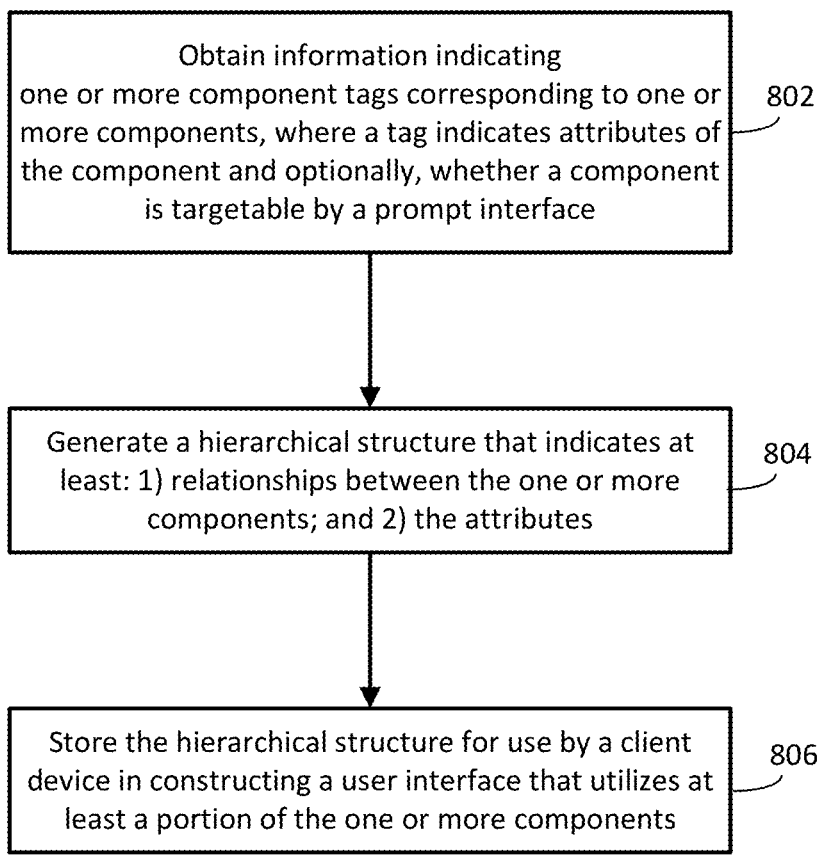
FIG. 8A shows a flowchart of an example process for constructing a hierarchical structure in accordance with some implementations.

FIG. 8A shows an example of a process 800 for constructing and storing a hierarchical structure based on component tags in accordance with some implementations. In some implementations, blocks of process 800 may be performed on a server. In some implementations, blocks of process 800 may be performed in an order other than what is shown in FIG. 8A. In some implementations, two or more blocks of process 800 may be performed substantially in parallel. In some implementations, one or more blocks of process 800 may be omitted.

At 802, process 800 obtains information indicating one or more component tags corresponding to one or more components. For a particular component, a corresponding tag may indicate attributes of the components. In some implementations, the tag may indicate whether the component is targetable by a prompt interface. The attributes may include an identifier of the component, an API to be called in connection with the component (e.g., to render the component, to populate fields or sub-components of the component, etc.), a function to be called to make a particular portion of the component that is targetable to be made visible, etc.

In some implementations, process 800 may obtain the information in any suitable manner. For example, in some implementations, process 800 may query a database to retrieve a set of tags associated with a set of components. In some implementations, a particular set of components may be associated with a common theme or entity, such as a particular customer, a particular type of user interface that may be constructed using the set of components, or the like.

At 804, process 800 can generate a hierarchical structure that indicates at least: 1) relationships between the one or more components; and 2) the attributes. For example, in some implementations, process 800 can generate a JSON structure. An example of such a JSON structure is shown in and described above in connection with FIG. 6. As another example, in some implementations, process 800 can generate an XML structure. In some implementations, process 800 can generate the hierarchical structure by parsing a tag associated with a component and subsequently populating fields of the hierarchical structure based on attribute values obtained from the parsed tag (e.g., based at least in part on the DOM). It should be noted that in instances in which attributes included in a particular tag indicate an API associated with the component, process 800 can translate the API name as specified by the attribute to a FK that corresponds to a key in a database.

At 806, process 800 can store the hierarchical structure for use by a client device in constructing a user interface that utilizes at least a portion of the one or more components. For example, process 800 can store the hierarchical structure in a database for later access and/or use.

Figure 8B:
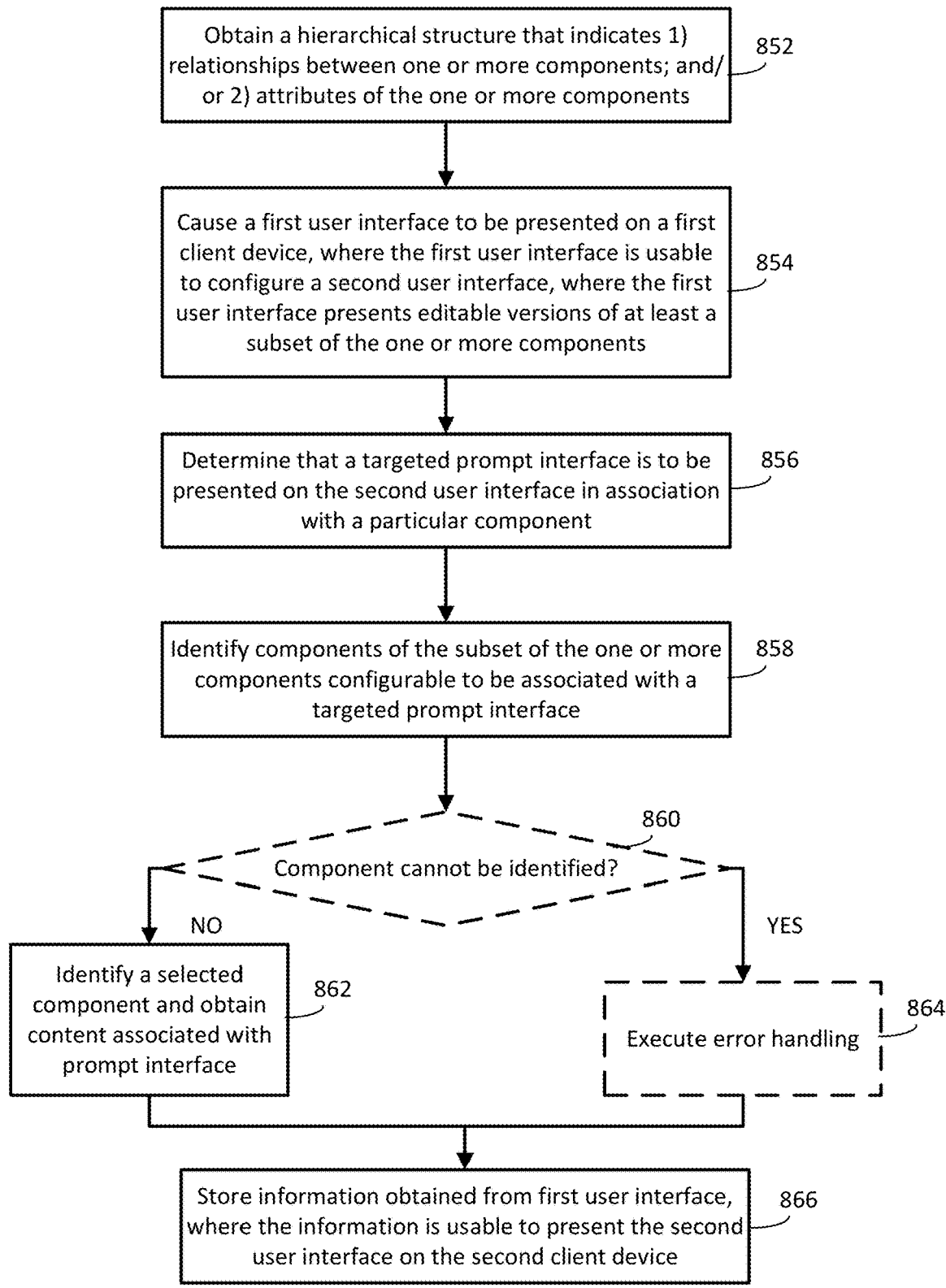
FIG. 8B shows a flowchart of an example process for presenting a first user interface usable to construct a second user interface based on a hierarchical structure in accordance with some implementations.

FIG. 8B shows an example of a process 850 for utilizing a hierarchical structure to generate a first user interface that is usable for constructing or building a second user interface in accordance with some implementations. In some implementations, blocks of process 850 may be executed by a client device, such as a client device of a creator or builder of the second user interface. In some implementations, two or more blocks of process 850 may be executed substantially in parallel. In some implementations, one or more blocks of process 850 may be omitted.

Process 850 can begin at 852 by obtaining a hierarchical structure that indicates 1) relationships between one or more components; and/or 2) attributes of the one or more components. For example, the relationships may indicate whether one component is nested within another component. As another example, the relationships may indicate whether a component is required to be nested within another component. As yet another example, the attributes may indicate whether a component is targetable by a prompt interface, a name or identifier of the component, an API to be called in connection with the component, a function to be called to cause a particular portion of the component to be made visible, or the like. In some implementations, process 850 may obtain the hierarchical structure from a server that generated the hierarchical structure (e.g., as described above in connection with FIG. 8A).

At 854, process 850 can cause a first user interface to be presented on a first client device, where the first user interface is usable to configure a second user interface, and where the first user interface presents editable versions of at least a subset of the components. An example of such a first user interface is shown in and described above in connection with FIGS. 1A-1C. In some implementations, the first client device may receive input via the first user interface to modify aspects of the components (e.g., moving, resizing, editing content presented in connection with, etc.).

At 856, process 850 can determine that a targeted prompt interface is to be presented on the second user interface in connection with a particular component. In some implementations, process 850 can determine that the prompt interface is to be presented based on an input received via the first user interface. For example, in some implementations, process 850 can determine that a targeted prompt interface is to be presented based on receiving a selection of a "targeted prompt interface" type of prompt interface from a selection tool presented within the first user interface (e.g., as shown in and described above in connection with FIGS. 1A-1C).

At 858, process 850 can identify components of the subset of components presented on the first user interface that are configurable to be associated with a targeted prompt interface. For example, process 850 can execute a run-time script (e.g., a Javascript script) that iterates through the hierarchical structure to identify targetable components. In some implementations, the targetable components may be identified based on an attribute identifier that specifies a name of a targetable component. In some implementations, the targetable components may be identified based on an attribute identifier of a targetable component as indicated in the hierarchical structure (and as specified by the component tag) matching an identifier of a targetable component and being nested within a required parent component.

In some implementations, process 850 can cause components of the subset of components presented on the first user interface that are identified as being targetable components to be indicated in any suitable manner. For example, in some implementations, process 850 can visually highlight the identified targetable components (e.g., by displaying the identified targetable components with a visible border, as shown in and described above in connection with FIG. 1B). In some implementations, visually highlighted targetable components may then become available for selection within the first user interface to be associated with a targeted prompt interface. As another example, process 850 can present a list of the identified targetable components. As a more particular example, in some implementations, process 850 can cause a drop-down menu of identified targetable components to be presented, such that a user of the first user interface can select a particular targetable component.

At 860, process 850 can determine whether any particular targetable components were not identified within the first user interface. For example, in an instance in which process 850 was searching for a targetable component having a particular identifier, and in which such an identifier was not found in the components presented in the first user interface, process 850 can determine that a targetable component was not identified. As another example, in an instance in which process 850 was searching for a targetable component having a particular identifier and nested within a particular parent component and in which no such targetable component was found, process 850 can determine that a targetable component was not identified.

If, at 860, process 850 determines that all targetable components were correctly identified ("no" at 860), process 850 can proceed to 862 and can identify a selected component out of the identified targetable components and can obtain content to be presented in association with the targeted prompt interface. For example, in some implementations, process 850 can obtain a selection of a particular targetable component. Continuing with this example, in some implementations, process 850 can then obtain content (e.g., text, images, graphics, icons, hyperlinks, etc.) to be presented in the targeted prompt interface to be presented in connection with the targetable component, as shown in and described above in connection with FIG. 1C.

Conversely, if, at 860, process 850 determines that at least one targetable component was not identified ("yes" at 860), process 850 can proceed to 864 and can execute error handling. For example, in some implementations, process 850 can indicate that a particular targetable component (e.g., a particular settings button, a particular tab, etc.) was not identified. The indication may be presented via an error message. As another example, in some implementations, process 850 can execute a fallback routine that searches for the targetable component in a different manner. As a more particular example, in an instance in which the targetable component that was not identified is indicated as to be nested within a particular parent component, process 850 can search for targetable components matching the identifier but not nested within the parent component and/or with a different path. As another more particular example, a fallback routine may cause a prompt associated with a different prompt type (e.g., a floating prompt) to be presented rather than a targeted prompt interface. As yet another more particular example, a fallback routine may cause the application to show an error message (e.g., that indicates that the targetable component was not identified) and exit.

At 866, process 850 can store the information obtained from the first user interface. The information may include positions of the components, edits or modifications made to the components, targetable components that have been selected for targeting by a targeted prompt interface, content associated with the particular prompt interfaces, etc. The information may be stored in a manner that is usable to present the second user interface on the second client device. For example, when the selected targetable component is rendered on the second user interface, the selectable targetable component may be rendered in connection with the targeted prompt interface and any associated content that was specified in block 862. The information may be stored on a server, such as a server that constructed the hierarchical structure and/or a server in communication with the server that constructed the hierarchical structure.

Figure 9A:
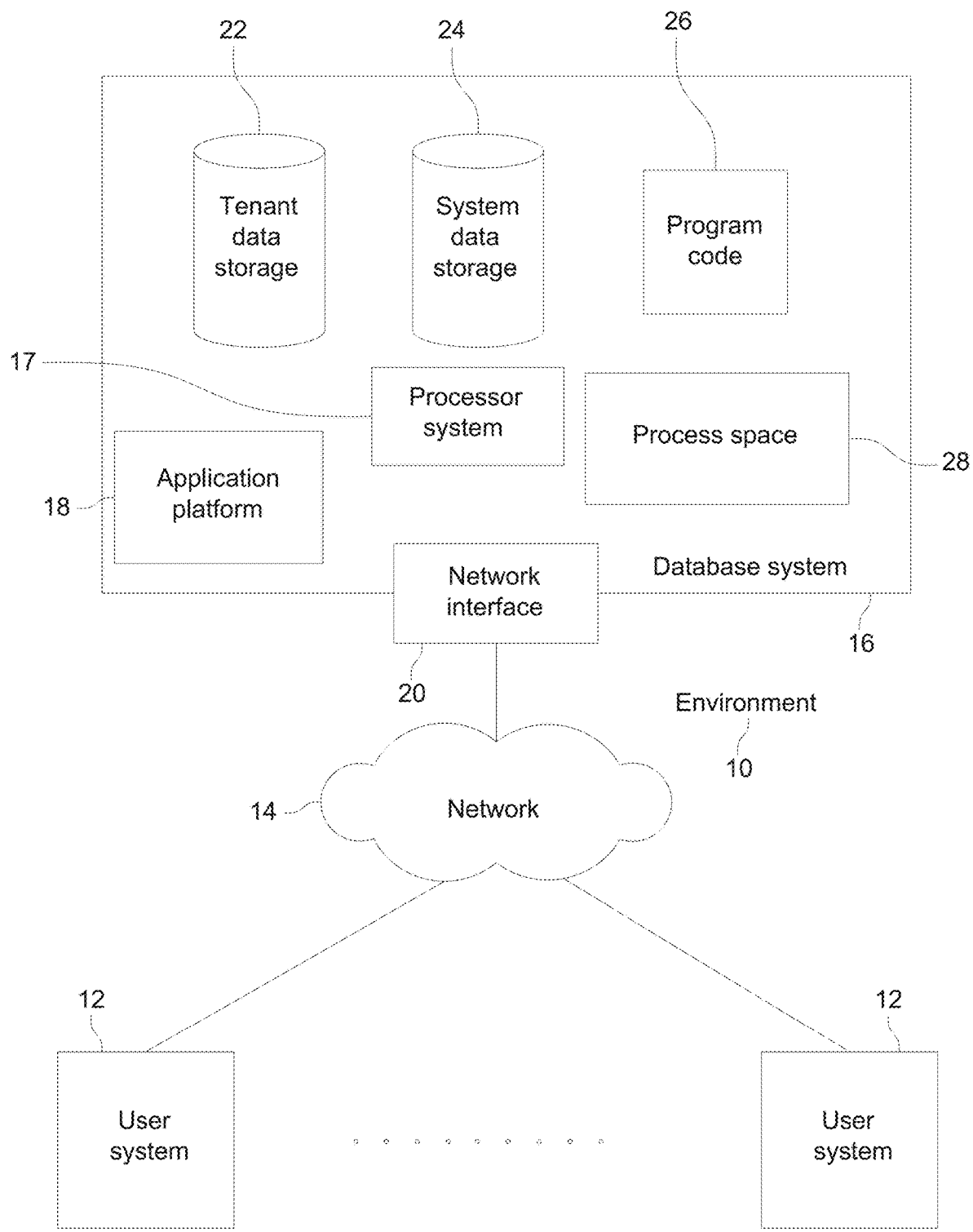
FIG. 9A shows a block diagram of an example of an environment 10 in which an on-demand database service can be used in accordance with some implementations.

FIG. 9A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a workstation and/or a network of computing devices. As illustrated in FIG. 9A (and in more detail in FIG. 9B) user systems 12 might interact via a network 14 with an on-demand database service, which is implemented in the example of FIG. 9A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 9A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 9B:
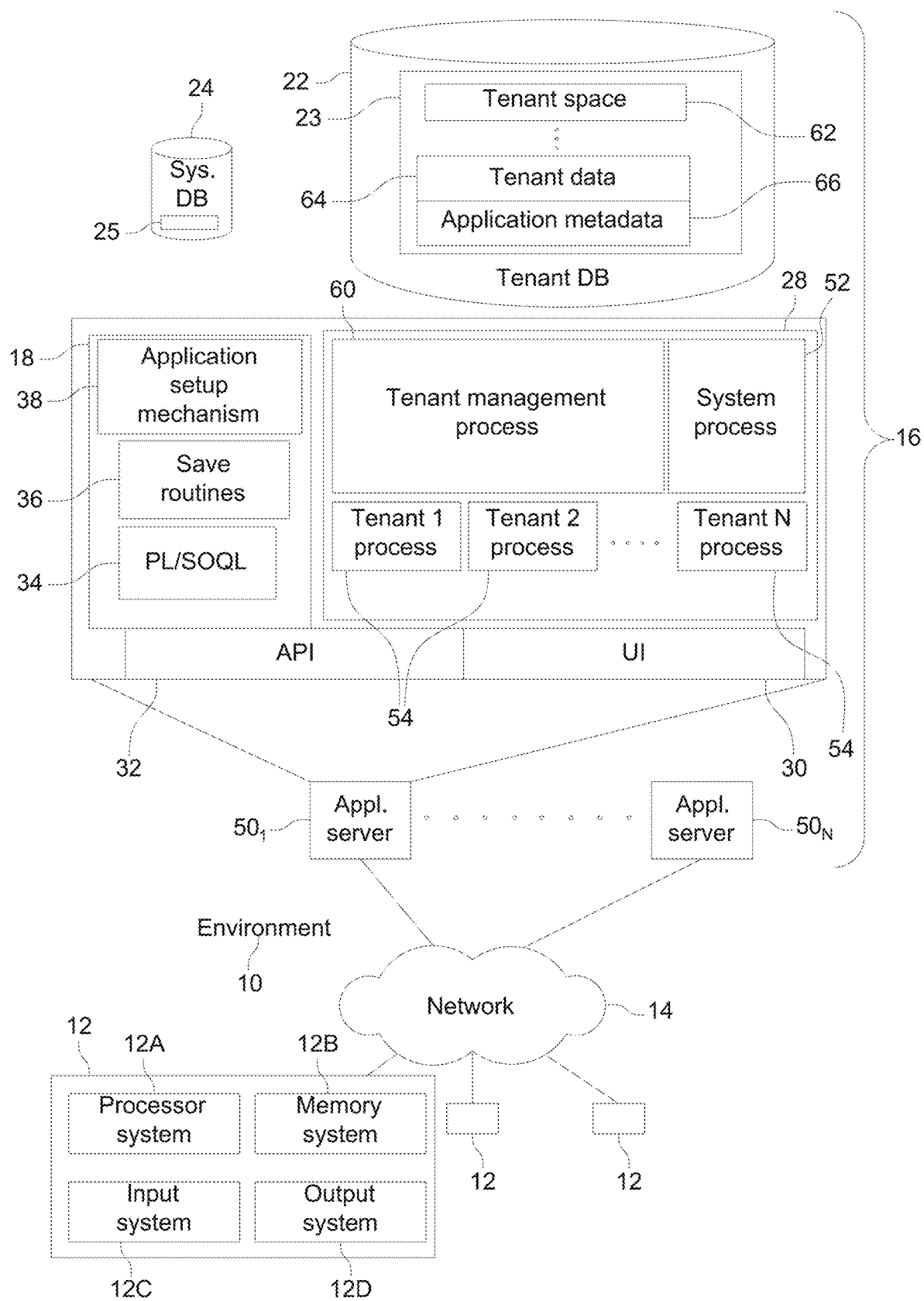
FIG. 9B shows a block diagram of an example of some implementations of elements of FIG. 9A and various possible interconnections between these elements.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 9A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 9B shows a block diagram of an example of some implementations of elements of FIG. 9A and various possible interconnections between these elements. That is, FIG. 9B also illustrates environment 10. However, in FIG. 9B elements of system 16 and various interconnections in some implementations are further illustrated. FIG. 9B shows that user system 12 may include processor system 12A, memory system 12B, input system 12C, and output system 12D. FIG.

9B shows network 14 and system 16. FIG. 9B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 9A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 9B, system 16 may include a network interface 20 (of FIG. 9A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UT 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
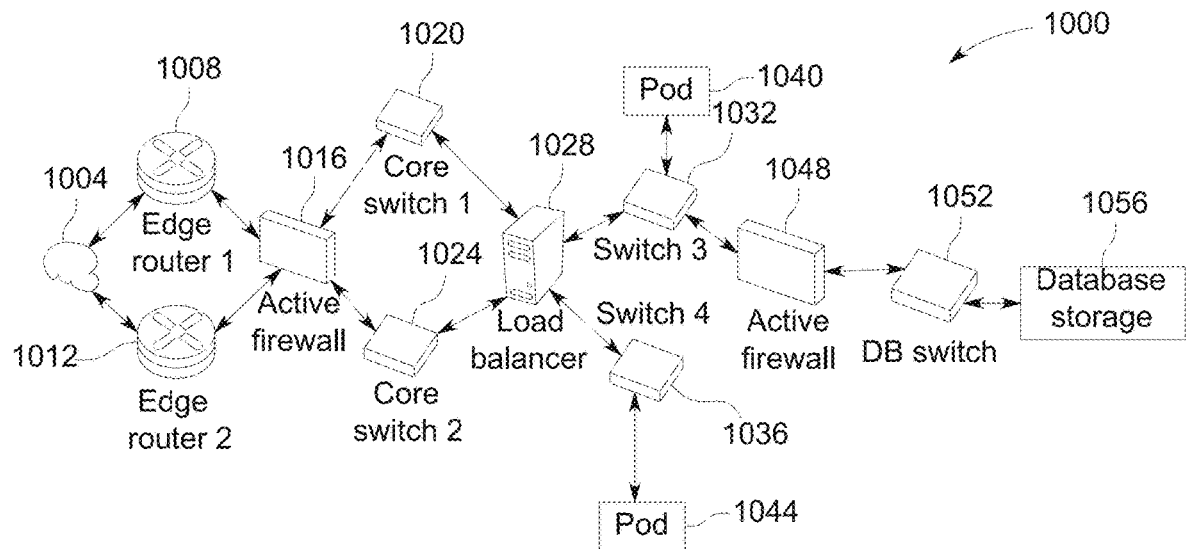
FIG. 10A shows a system diagram of an example of architectural components of an on-demand database service environment 900, in accordance with some implementations.

FIG. 10A shows a system diagram of an example of architectural components of an on-demand database service environment 1000, in accordance with some implementations. A client machine located in the cloud 1004, generally referring to one or more networks in combination, as described herein, may communicate with the on-demand database service environment via one or more edge routers 1008 and 1012. A client machine can be any of the examples of user systems 12 described above. The edge routers may communicate with one or more core switches 1020 and 1024 via firewall 1016. The core switches may communicate with a load balancer 1028, which may distribute server load over different pods, such as the pods 1040 and 1044. The pods 1040 and 1044, which may each include one or more servers and/or other computing resources, may perform data processing and other operations used to provide on-demand services. Communication with the pods may be conducted via pod switches 1032 and 1036. Components of the on-demand database service environment may communicate with a database storage 1056 via a database firewall 1048 and a database switch 1052.

Figure 10B:
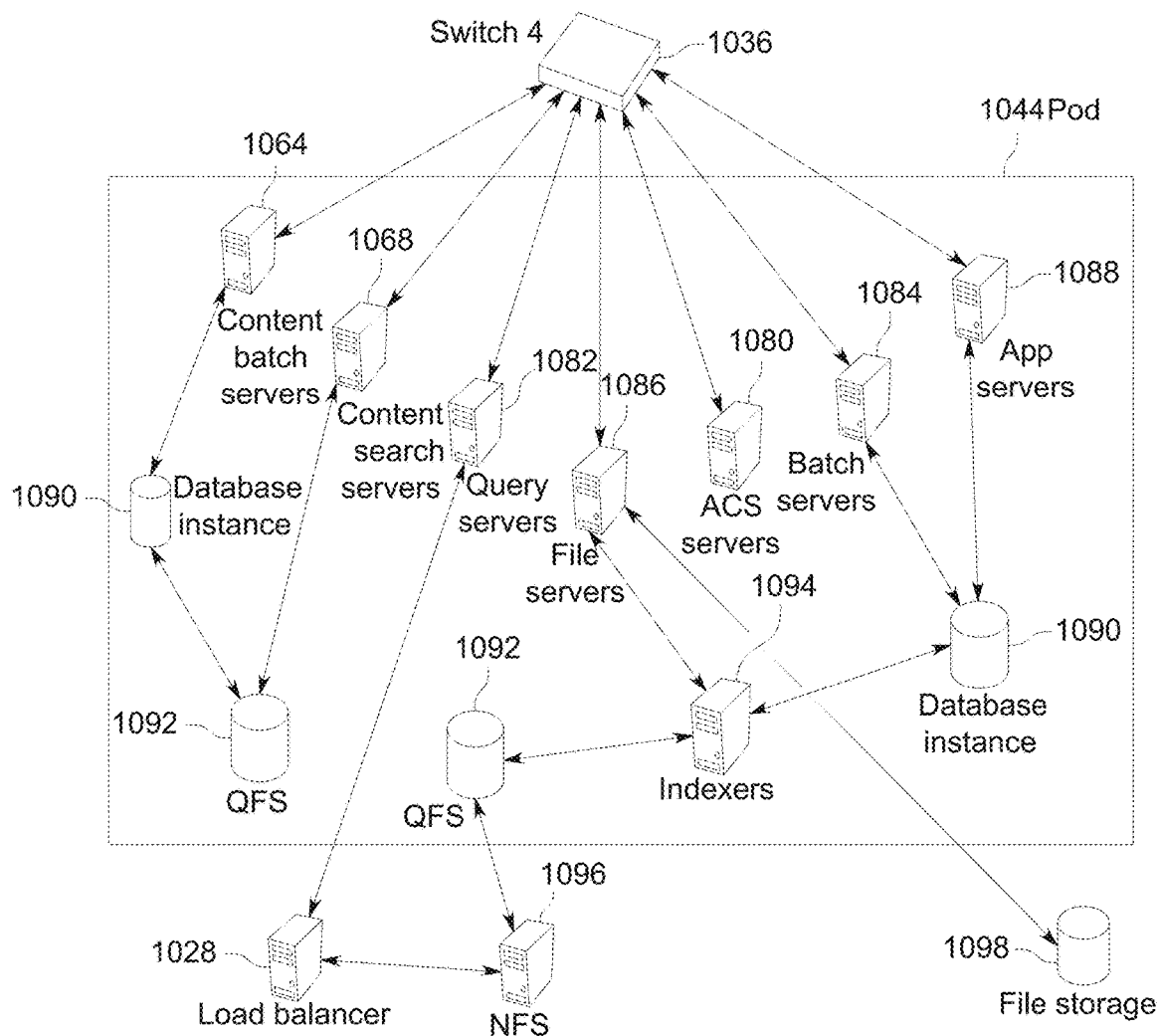
FIG. 10B shows a system diagram further illustrating an example of architectural components of an on-demand database service environment, in accordance with some implementations.

As shown in FIGS. 10A and 10B, accessing an on-demand database service environment may involve communications transmitted among a variety of different hardware and/or software components. Further, the on-demand database service environment 1000 is a simplified representation of an actual on-demand database service environment. For example, while only one or two devices of each type are shown in FIGS. 10A and 10B, some implementations of an on-demand database service environment may include anywhere from one to many devices of each type. Also, the on-demand database service environment need not include each device shown in FIGS. 10A and 10B, or may include additional devices not shown in FIGS. 10A and 10B.

Moreover, one or more of the devices in the on-demand database service environment 1000 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1004 is intended to refer to a data network or combination of data networks, often including the Internet. Client machines located in the cloud 1004 may communicate with the on-demand database service environment to access services provided by the on-demand database service environment. For example, client machines may access the on-demand database service environment to retrieve, store, edit, and/or process information.

In some implementations, the edge routers 1008 and 1012 route packets between the cloud 1004 and other components of the on-demand database service environment 1000. The edge routers 1008 and 1012 may employ the Border Gateway Protocol (BGP). The BGP is the core routing protocol of the Internet. The edge routers 1008 and 1012 may maintain a table of IP networks or 'prefixes', which designate network reachability among autonomous systems on the Internet.

In one or more implementations, the firewall 1016 may protect the inner components of the on-demand database service environment 1000 from Internet traffic. The firewall 1016 may block, permit, or deny access to the inner components of the on-demand database service environment 1000 based upon a set of rules and other criteria. The firewall 1016 may act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 may be configured as network bridges that quickly route data between different components within the on-demand database service environment. In some implementations, the use of two or more core switches 1020 and 1024 may provide redundancy and/or reduced latency.

In some implementations, the pods 1040 and 1044 may perform the core data processing and service functions provided by the on-demand database service environment. Each pod may include various types of hardware and/or software computing resources. An example of the pod architecture is discussed in greater detail with reference to FIG. 10B.

In some implementations, communication between the pods 1040 and 1044 may be conducted via the pod switches 1032 and 1036. The pod switches 1032 and 1036 may facilitate communication between the pods 1040 and 1044 and client machines located in the cloud 1004, for example via core switches 1020 and 1024. Also, the pod switches 1032 and 1036 may facilitate communication between the pods 1040 and 1044 and the database storage 1056.

In some implementations, the load balancer 1028 may distribute workload between the pods 1040 and 1044. Balancing the on-demand service requests between the pods may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048. The database firewall 1048 may act as a computer application firewall operating at the database application layer of a protocol stack. The database firewall 1048 may protect the database storage 1056 from application attacks such as structure query language (SQL) injection, database rootkits, and unauthorized information disclosure.

In some implementations, the database firewall 1048 may include a host using one or more forms of reverse proxy services to proxy traffic before passing it to a gateway router. The database firewall 1048 may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, communication with the database storage 1056 may be conducted via the database switch 1052. The multi-tenant database storage 1056 may include more than one hardware and/or software components for handling database queries. Accordingly, the database switch 1052 may direct database queries transmitted by other components of the on-demand database service environment (e.g., the pods 1040 and 1044) to the correct components within the database storage 1056.

In some implementations, the database storage 1056 is an on-demand database system shared by many different organizations. The on-demand database service may employ a multi-tenant approach, a virtualized approach, or any other type of database approach. On-demand database services are discussed in greater detail with reference to FIGS. 10A and 10B.

FIG. 10B shows a system diagram further illustrating an example of architectural components of an on-demand database service environment, in accordance with some implementations. The pod 1044 may be used to render services to a user of the on-demand database service environment 1000. In some implementations, each pod may include a variety of servers and/or other systems. The pod 1044 includes one or more content batch servers 1064, content search servers 1068, query servers 1082, file servers 1086, access control system (ACS) servers 1080, batch servers 1084, and app servers 1088. Also, the pod 1044 includes database instances 1090, quick file systems (QFS) 1092, and indexers 1094. In one or more implementations, some or all communication between the servers in the pod 1044 may be transmitted via the switch 1036.

The content batch servers 1064 may handle requests internal to the pod. These requests may be long-running and/or not tied to a particular customer. For example, the content batch servers 1064 may handle requests related to log mining, cleanup work, and maintenance tasks.

The content search servers 1068 may provide query and indexer functions. For example, the functions provided by the content search servers 1068 may allow users to search through content stored in the on-demand database service environment.

The file servers 1086 may manage requests for information stored in the file storage 1098. The file storage 1098 may store information such as documents, images, and basic large objects (BLOBs). By managing requests for information using the file servers 1086, the image footprint on the database may be reduced.

The query servers 1082 may be used to retrieve information from one or more file systems. For example, the query system 1082 may receive requests for information from the app servers 1088 and then transmit information queries to the NFS 1096 located outside the pod.

The pod 1044 may share a database instance 1090 configured as a multi-tenant environment in which different organizations share access to the same database. Additionally, services rendered by the pod 1044 may call upon various hardware and/or software resources. In some implementations, the ACS servers 1080 may control access to data, hardware resources, or software resources.

In some implementations, the batch servers 1084 may process batch jobs, which are used to run tasks at specified times. Thus, the batch servers 1084 may transmit instructions to other servers, such as the app servers 1088, to trigger the batch jobs.

In some implementations, the QFS 1092 may be an open source file system available from Sun Microsystems® of Santa Clara, Calif. The QFS may serve as a rapid-access file system for storing and accessing information available within the pod 1044. The QFS 1092 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1068 and/or indexers 1094 to identify, retrieve, move, and/or update data stored in the network file systems 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information to access files over a network in a manner similar to how local storage is accessed.

In some implementations, queries from the query servers 1022 may be transmitted to the NFS 1096 via the load balancer 1028, which may distribute resource requests over various resources available in the on-demand database service environment. The NFS 1096 may also communicate with the QFS 1092 to update the information stored on the NFS 1096 and/or to provide information to the QFS 1092 for use by servers located within the pod 1044.

In some implementations, the pod may include one or more database instances 1090. The database instance 1090 may transmit information to the QFS 1092. When information is transmitted to the QFS, it may be available for use by servers within the pod 944 without using an additional database call.

In some implementations, database information may be transmitted to the indexer 1094. Indexer 1094 may provide an index of information available in the database 1090 and/or QFS 1092. The index information may be provided to file servers 1086 and/or the QFS 1092.

In some implementations, one or more application servers or other servers described above with reference to FIGS. 9A and 9B include a hardware and/or software framework configurable to execute procedures using programs, routines, scripts, etc. Thus, in some implementations, one or more of application servers $50_1$-$50_N$ of FIG. 9B can be configured to implement components and initiate performance of one or more of the operations described above with reference to FIGS. 1-8B by instructing another computing device to perform an operation. In some implementations, one or more application servers $50_1$-$50_N$ carry out, either partially or entirely, one or more of the disclosed operations described with reference to FIGS. 1-8B. In some implementations, app servers 1088 of FIG. 10B support the construction of applications provided by the on-demand database service environment 1000 via the pod 1044. Thus, an app server 1088 may include a hardware and/or software framework configurable to execute procedures to partially or entirely carry out or instruct another computing device to carry out one or more operations disclosed herein, including operations described above with reference to FIGS. 1-8B. In alternative implementations, two or more app servers 1088 may cooperate to perform or cause performance of such operations. Any of the databases and other storage facilities described above with reference to FIGS. 9A, 9B, 10A and 10B can be configured to store lists, articles, documents, records, files, and other objects for implementing the operations described above with reference to FIGS. 1-8B. For instance, lists of available communication channels associated with share actions for sharing a type of data item can be maintained in tenant data storage 22 and/or system data storage 24 of FIGS. 9A and 9B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 9A, 9B, 10A and 10B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a server system comprising one or more processors in communication with one or more memory devices, the server system configurable to cause:
obtaining a plurality of tags corresponding to a plurality of components available for presentation on a web page, one or more tags of the plurality of tags including one or more attributes indicating a corresponding one or more components of the plurality of components as being configurable to be associated with a prompt interface; and
providing data to a first client device, the data configured to be processed to cause display of a first user interface based at least in part on a hierarchical structure indicating the corresponding one or more components configurable to be associated with the prompt interface, the first user interface being operable to:
receive content to be associated with the prompt interface for a selected one of the corresponding one or more components, and
allow a second user interface to be displayed at a second client device, the second user interface including a presentation of the prompt interface including the content associated with the prompt interface and with the selected component.

2. The system of claim 1, wherein the hierarchical structure indicates relationships between the plurality of components, and wherein the relationships comprise an indication that a first component of the plurality of components is a child of a second component of the plurality of components.

3. The system of claim 2, wherein the first component is identified as configurable to be associated with the prompt interface based on (i) an identifier of the first component specified in a tag of the plurality of tags corresponding to the first component; and (ii) the indication that the first component is a child of the second component.

4. The system of claim 1, wherein the first user interface comprises a selection tool for selecting a type of prompt interface, and wherein selecting the component for association with the prompt interface is responsive to the type of prompt interface being a targeted prompt interface type.

5. The system of claim 4, wherein responsive to the type of prompt interface being the targeted prompt interface type, the one or more components that are configurable to be associated with the prompt interface are identified within the first user interface based on the hierarchical structure.

6. The system of claim 1, wherein the attributes associated with a component of the plurality of components comprise an identifier of an Application Programming Interface (API) to be called when rendering the component.

7. The system of claim 1, wherein the attributes associated with a component of the plurality of components comprise an identifier of a function to be called, and wherein calling the function causes a portion of the component to which the prompt interface is to be associated to be made visible.

8. A non-transitory computer-readable medium comprising computer-readable instructions that, when executed by one or more processors, cause the one or more processors to execute operations comprising:
obtaining a plurality of tags corresponding to a plurality of components available for presentation on a web page, one or more tags of the plurality of tags including one or more attributes indicating a corresponding one or more components of the plurality of components as being configurable to be associated with a prompt interface; and
providing data to a first client device, the data configured to be processed to cause display of a first user interface based at least in part on a hierarchical structure indicating the corresponding one or more components configurable to be associated with the prompt interface, the first user interface being operable to:
receive content to be associated with the prompt interface for a selected one of the corresponding one or more components, and
allow a second user interface to be displayed at a second client device, the second user interface including a presentation of the prompt interface including the content associated with the prompt interface and with the selected component.

9. The non-transitory computer-readable medium of claim 8, wherein the hierarchical structure indicates relationships between the plurality of components, and wherein the relationships comprise an indication that a first component of the plurality of components is a child of a second component of the plurality of components.

10. The non-transitory computer-readable medium of claim 9, wherein the first component is identified as configurable to be associated with the prompt interface based on (i) an identifier of the first component specified in a tag of the plurality of tags corresponding to the first component; and (ii) the indication that the first component is a child of the second component.

11. The non-transitory computer-readable medium of claim 8, wherein the first user interface comprises a selection tool for selecting a type of prompt interface, and wherein selecting the component for association with the prompt interface is responsive to the type of prompt interface being a targeted prompt interface type.

12. The non-transitory computer-readable medium of claim 11, wherein responsive to the type of prompt interface being the targeted prompt interface type, the one or more components that are configurable to be associated with the prompt interface are identified within the first user interface based on the hierarchical structure.

13. The non-transitory computer-readable medium of claim 8, wherein the attributes associated with a component of the plurality of components comprise an identifier of an Application Programming Interface (API) to be called when rendering the component.

14. The non-transitory computer-readable medium of claim 8, wherein the attributes associated with a component of the plurality of components comprise an identifier of a function to be called, and wherein calling the function causes a portion of the component to which the prompt interface is to be associated to be made visible.

15. A method comprising:
obtaining a plurality of tags corresponding to a plurality of components available for presentation on a web page, one or more tags of the plurality of tags including one or more attributes indicating a corresponding one or more components of the plurality of components as being configurable to be associated with a prompt interface; and
providing data to a first client device, the data configured to be processed to cause display of a first user interface based at least in part on a hierarchical structure indicating the corresponding one or more components configurable to be associated with the prompt interface, the first user interface being operable to:
receive content to be associated with the prompt interface for a selected one of the corresponding one or more components, and
allow a second user interface to be displayed at a second client device, the second user interface including a presentation of the prompt interface including the content associated with the prompt interface and with the selected component.

16. The method of claim 15, wherein the hierarchical structure indicates relationships between the plurality of components, and wherein the relationships comprise an indication that a first component of the plurality of components is a child of a second component of the plurality of components.

17. The method of claim 16, wherein the first component is identified as configurable to be associated with the prompt interface based on (i) an identifier of the first component specified in a tag of the plurality of tags corresponding to the first component; and (ii) the indication that the first component is a child of the second component.

18. The method of claim 15, wherein the first user interface comprises a selection tool for selecting a type of prompt interface, and wherein selecting the component for association with the prompt interface is responsive to the type of prompt interface being a targeted prompt interface type.

19. The method of claim 15, wherein the attributes associated with a component of the plurality of components comprise an identifier of an Application Programming Interface (API) to be called when rendering the component.

20. The method of claim 15, wherein the attributes associated with a component of the plurality of components comprise an identifier of a function to be called, and wherein calling the function causes a portion of the component to which the prompt interface is to be associated to be made visible.

* * * * *